United States Patent
Lu et al.

(10) Patent No.: US 7,843,425 B2
(45) Date of Patent: Nov. 30, 2010

(54) MOTION RECOGNITION SYSTEM AND METHOD FOR CONTROLLING ELECTRONIC DEVICES

(75) Inventors: Ying-Ko Lu, Guishan Shiang (TW); Zhi-Wei Lian, Xindian (TW); Ming-Jye Tsai, Xinpu (TW); Shun-Nan Liou, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 851 days.

(21) Appl. No.: 11/580,301

(22) Filed: Oct. 13, 2006

(65) Prior Publication Data

US 2007/0139370 A1  Jun. 21, 2007

(30) Foreign Application Priority Data

Dec. 16, 2005  (TW) .............................. 94144623 A (51) Int. Cl.
*G09G 5/00* (2006.01)
*H03K 17/94* (2006.01)

(52) U.S. Cl. ........................................ 345/156; 341/20
(58) Field of Classification Search ......... 345/156–158; 341/20
See application file for complete search history.

(56) References Cited

U.S. PATENT DOCUMENTS

| | | | |
|---|---|---|---|
| 4,905,001 A | 2/1990 | Penner | 341/20 |
| 5,617,515 A | 4/1997 | MacLaren | 700/264 |
| 6,009,210 A | 12/1999 | Kang | 382/276 |
| 6,072,467 A * | 6/2000 | Walker | 345/157 |
| 6,626,728 B2 | 9/2003 | Holt | |
| 6,681,031 B2 | 1/2004 | Cohen | 382/103 |
| 6,744,420 B2 * | 6/2004 | Mohri | 345/157 |
| 6,747,632 B2 | 6/2004 | Howard | 345/158 |
| 6,876,496 B2 * | 4/2005 | French et al. | 359/630 |
| 7,129,927 B2 * | 10/2006 | Mattsson | 345/158 |
| 2004/0169636 A1 * | 9/2004 | Park et al. | 345/156 |
| 2005/0212759 A1 | 9/2005 | Marvit et al. | |
| 2005/0219213 A1 | 10/2005 | Cho et al. | |

FOREIGN PATENT DOCUMENTS

| | | |
|---|---|---|
| CN | 1549102 A | 11/2004 |
| TW | 1243698 | 7/2006 |

* cited by examiner

*Primary Examiner*—Amare Mengistu
*Assistant Examiner*—Randal Willis
(74) *Attorney, Agent, or Firm*—WPAT, PC; Justin King (57) ABSTRACT

A motion recognition system and method for controlling electronic devices are disclosed, in which at least a micro inertial sensor, each being arranged at a specific location of a human body, is used to detect and measure a motion of the body so as to correspondingly obtain a plurality of gesture parameters, such as angular velocity and acceleration, etc., and then the detected parameters are analyzed and converted into an input gesture sequence by a specific algorithm to be compared with a predefined motion information sequence so as to enable any of the controlled electronic devices to perform a specific operation according to the result of the comparison. In addition, a momentum can be obtained by performing a calculation upon the detected gestured parameters with respect to time, which can be used for controlling the interaction of the controlled electric devices.

25 Claims, 8 Drawing Sheets

MOTION RECOGNITION SYSTEM AND METHOD FOR CONTROLLING ELECTRONIC DEVICES

FIELD OF THE INVENTION

The present invention relates to a method and system capable of enabling users to interact with electronic devices, and more particularly, to a motion recognition system and method for controlling electronic devices to interact with a user, in which sensors are used to detect and measure motions of the user while the detected motions are converted into a time-related gesture sequence, i.e. a series of consecutive gestures with corresponding momentums, by a specific algorithm, and thereby the user is enabled to interact with electronic devices of the system.

BACKGROUND OF THE INVENTION

With the advance of technology, gesture recognition is playing a very important, role in, virtual reality applications and the control of electronic devices. There are already many studies focus on capturing and interpreting gestures of a user's body and then using the interpretation as inputs of a virtual reality application for enabling the user to interact with characters in the virtual reality ambient. One such study is a hand-free navigation system disclosed in U.S. Pat. No. 6,009,210, entitled "HAND-FREE INTERFACE TO A VIRTUAL REALITY ENVIRONMENT USING HEAD TRACKING", which uses a camera to catch images of a user's body and then the images are analyzed and interpreted so as to use the interpretation as inputs of an interactive virtual reality application. However, the cost of such system can be very expensive that it is not acceptable for general consumers and thus is not yet popularized and realized. Another such study is a hand-held communication device disclosed in U.S. Pat. No. 4,905,001, entitled "HAND-HELD FINGER MOVEMENT ACTUATED COMMUNICATION DEVICES AND SYSTEMS EMPLYING SUCH DEVICES", which can be a finger cot or wriest strap having a plurality of micro-switches that are subjected to be pressed by nature hand movements. By the on/off of those micro-switches activated by the pressing caused by hand movements, signals corresponding to the pressed micro-switches are sent to trigger responses of certain electronic devices such that those electronic devices are enabled to respond to natural hand movements. However, the aforesaid device can only be worn in the proximity of joints of a hand that it is failed to describe a complete moving gesture of the hand.

As the mature of MEM process, the size of micro inertial sensing component is greatly reduced. Therefore, it is common to use micro inertial sensing components to detect motions and kinematic poses generated by humans. One such apparatus is disclosed in U.S. Pat. No. 5,617,515, entitled "METHOD AND APPARATUS FOR CONTROLLING AND PROGRAMMING A ROBOT OR OTHER MOVEABLE OBJECT", in which inertial components are arranged inside an apparatus having a handle. As the handle is held in a hand of a user to enable the apparatus to rotate/move following the movement of the hand, a robotic arm remotely coupled to the apparatus is enabled to rotate/move following the orientation and translation detected by the inertial components.

In addition, another such apparatus is disclosed in U.S. Pat. No. 6,072,467, entitled "CONTINUOUSLY VARIABLE CONTROL OF ANIMATED ON-SCREEN CHARACTERS", which is an egg-shaped hand-held device having, a natural orientation when grasped by hand. As the egg-shaped device is moved or wave around by an individual in a series of motions, accelerations will be sensed by the accelerometers embedded in the device that are used to control on-screen animated characters presented by a computer-driven display. Moreover, the acceleration waveforms of a series of hand gestures are identifiable as a signal for generating a motion control of an animated character by correlating the template of histogram of such waveforms to the motion control, whereas the correlation between the templates and the motion controls is considered to be a predefined language that can be specified by an individual through a training session. For instance, movement of the egg-shaped quickly to the right and then to the left indicates to the system that a character right turn is required; a left turn is illustrated when egg-shaped device is moved quickly to the left and then to the right; an increase in speed is illustrated as a quick movement of egg-shaped device upwards, followed by a downward movement; and a decrease in speed is indicated oppositely. However, by using the aforesaid hand-held device to remotely control an on-screen animated characters, only hand gestures of an individual can be detected thereby while movements of other body parts, e.g. fingers, legs, etc., of the individual are not, and further that, a user must go through a training session before one can use the hand-held device to control the animated character at will as the correlation between the templates and the motion controls is considered to be a predefined language that required to be specified by the individual. Therefore, the aforesaid hand-held device is short that: the degree-of-freedom of the device is not sufficient and the learning session might be difficult for ordinary user since the language may become very complicated as the motion control increases.

Another study of gesture recognition focus on developing a sensing device that can be worn or adhere to any part of a user's body so as to describe a complete body movement of the user. One such device is disclosed in U.S. Pat. No. 6,747,632, entitled "WIRELESS CONTROL DEVICE", which can be a housing worn on a user. The housing has several light emitting diodes ("LEDs") operating in the infrared range, project well-defined beams of energy over a limited solid angle generally parallel to the palm of the user's hand. The solid angle of the beams is preferably limited such that the illuminated regions will not overlap at a distance from housing 22 that is closer than the fingertips of the user. Thus, movement of the user's hand, such as movement of a finger in a motion similar to pressing a key on a keyboard, will cause the tip of the user's finger to be illuminated by a beam. This illumination is reflected from the user's fingertip and detected by a detector, also on the housing. Thus, by correlation of reflected beams with emitted beams, the placement of any finger or other object can be not only detected but also differentiated from any other location, and an appropriate coded signal can be sent from the housing to an electronic device controlled by the housing. In addition, except for those LEDs, there may be several inertial sensors there's no detailed description disclosed in the aforesaid U.S. patent referring about the operation principle of the inertial sensors.

Figure 1:
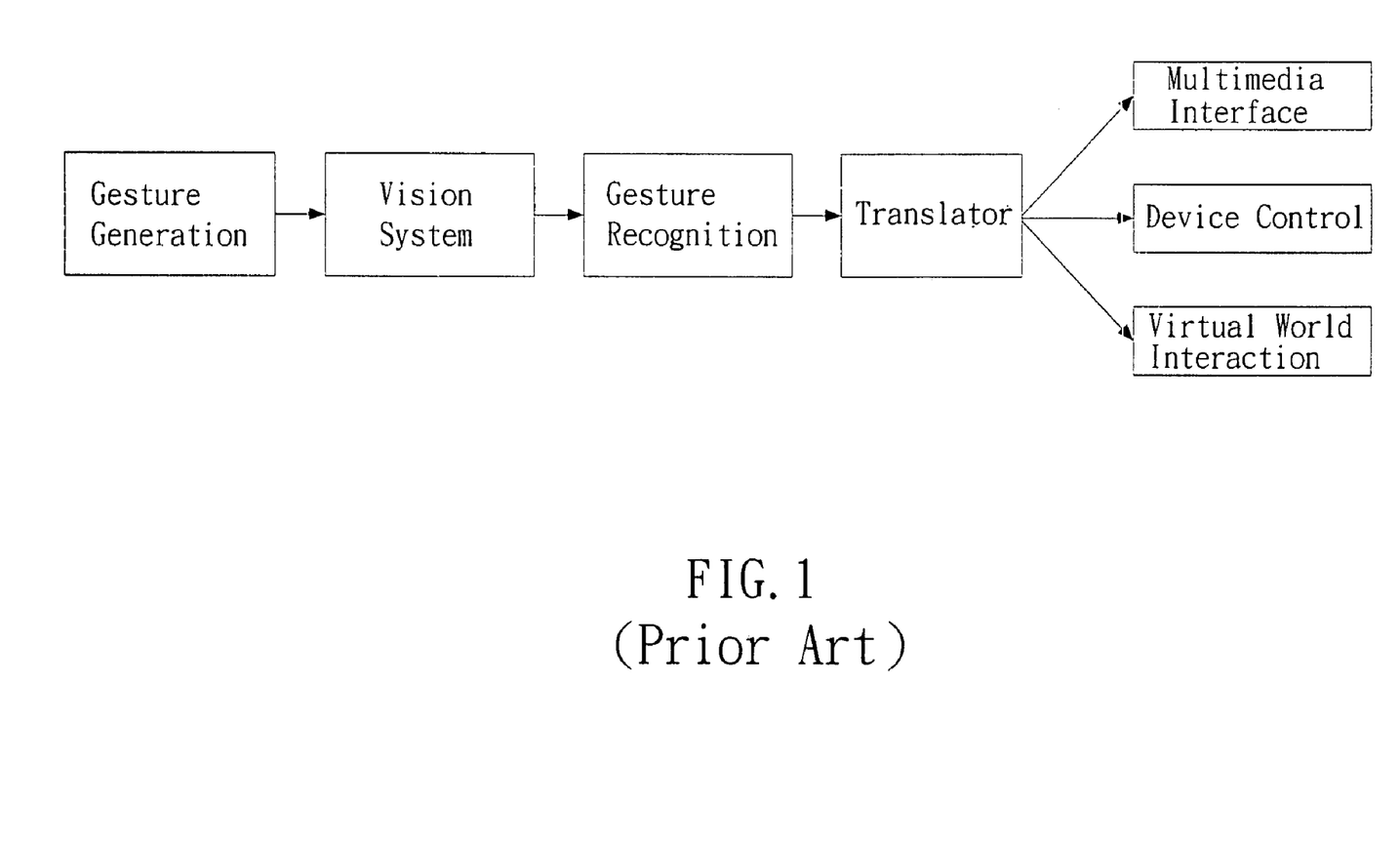
FIG. 1 shows a human gesture recognition disclosed in U.S. Pat. No. 6,681,031.

One more study about human gesture recognition is disclosed in U.S. Pat. No. 6,681,031, entitled "GESTURE-CONTROLLED INTERFACES FOR SELF-SERVICE MACHINES AND OTHER APPLICATIONS", as shown in FIG. 1, which details methods for gesture recognition, as well as the overall architecture for using gesture recognition to control of devices. There is a one-to-one relation between a gesture and a command message corresponding thereto. During the gesture making process, a video image is captured for producing image data along with timing information. As the image data is produced, a feature-tracking algorithm is implemented which outputs position and time information, whereas the position information is processed by static and dynamic gesture recognition algorithms. When the gesture is recognized, a command message corresponding to that gesture type is sent to the device to be controlled, which then performs the appropriate response. However, in the aforesaid U.S. patent, a video image is still required for gesture recognition so that such gesture recognition apparatus can not be portable, convenient-to-use, and inexpensive.

Therefore, it is in great need to have a motion recognition system and method for controlling electronic devices to interact with a user, which is free from the shortcomings of prior art.

SUMMARY OF THE INVENTION

It is the primary object of the present invention to provide a motion recognition system and method for controlling electronic devices to interact with a user, which is capable of detecting accelerations and angular velocities generated by a series of the user's gestures while transmitting the detected accelerations and angular velocities by a wireless communication means to a receiving end to be calculated and analyzed by a specific algorithm for converting the received data into an time-relating gesture sequence, and then comparing the time-relating gesture sequence with a predefined motion information sequence so as to enable any of the controlled electronic devices to perform a specific operation according to the result of the comparison.

It is another object of the invention to provide a motion recognition system and method for controlling electronic devices to interact with a user, which is capable of detecting accelerations and angular velocities generated by a series of the user's gestures while performing a calculation upon the detected accelerations and angular velocities for obtaining a momentum to be used for controlling the electronic devices to interact with the user accordingly.

Yet, another object of the invention is to provide a motion recognition system and method for controlling an electronic device to interact with a user, which is capable of defining a series of gestures to be used as a code for locking/unlocking, or activate/deactivate the electronic device.

To achieve the above objects, the present invention provides a motion recognition method for controlling an electronic device to interact with a user, which comprise steps of:
provide a predefined motion information sequence;
utilizing sensors to detect a series of gestures created by the user;
processing signals detected by the sensors to form an input gesture sequence; and
comparing the input gesture sequence with the predefined motion information sequence for generating a series of motion control signals.

Preferably, the predefined motion information sequence can be a single motion control signal or a combination of a plurality of motion control signals.

Preferably, the predefined motion information sequence is composed of control signals capable of enabling an interactive platform to generate a series of predefined motions.

Preferably, the predefined motion information sequence is substantially a time series of acceleration.

Preferably, the predefined motion information sequence is substantially a time series of angular velocity.

Preferably, the motion recognition method further comprise a step of:
enabling the electronic device to operate according to the series of motion control signals while the input gesture sequence matches the predefined motion information sequence; wherein, the electronic device can be a household appliance or an interactive multimedia device.

Preferably, the motion recognition method further comprise a step of:
processing signals detected by the sensors for obtaining a momentum to be used for controlling the electronic device to interact with the user accordingly; wherein, the momentum can be acceleration, velocity, displacement, frequency, time or the combination thereof, moreover, it can be a measurement of calorie consumed per unit time obtained by performing a conversion upon the momentum.

In addition, to achieve the above objects, the present invention provides a motion recognition system for controlling an electronic device to interact with a user, which comprises:
at least an inertial sensor, adapted to be arranged on the user's body, for detecting a gesture parameter of the body and generating a gesture signal accordingly; and
an operation control module, for receiving the gesture signal, further comprising:
a storage unit, for storing at least a predefined motion information sequence; and
a control unit, electrically connected to the storage unit, for performing a calculation upon the received gesture signal to obtain an input gesture sequence while comparing the input gesture sequence with at least one of the predefined motion information sequences stored in the storage unit.

Preferably, the control signal is capable of processing signals detected by the inertial sensor for obtaining a momentum to be used for controlling the electronic device to interact with the user accordingly; wherein, the momentum can be acceleration, velocity, displacement, frequency, time or the combination thereof, moreover, it can be a measurement of calorie consumed per unit time obtained by performing a conversion upon the momentum.

Preferably, the gesture signal is transmitted to the operation control module by a wireless communication means.

Preferably, the gesture parameter can be an angular velocity, an acceleration or the combination of the two.

Furthermore, to achieve the above objects, the present invention provides a motion recognition method for controlling an electronic device to interact with a user, which comprise steps of:
loading at least a predefined motion information sequence into a storage unit;
adapting at least an inertial sensor to be arranged at the user's body;
enabling the user to create a series of gestures;
enabling each inertial sensor to detect the series of gestures;
performing a signal processing operation upon signals detected by each inertial sensor to form an input gesture sequence;
comparing the input gesture sequence with each predefined motion information sequence, and generating a series of motion control signals while the input gesture sequence matches at least of the predefined motion information sequence; and
enabling the electronic device to operate according to the series of motion control signals.

Preferably, the signal processing operation further comprises steps of:

performing a calculation to obtain a datum point of the series of gestures created by the user; and processing signals detected by the sensors to analyze the series of gestures and thus generate an input gesture sequence.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 2:
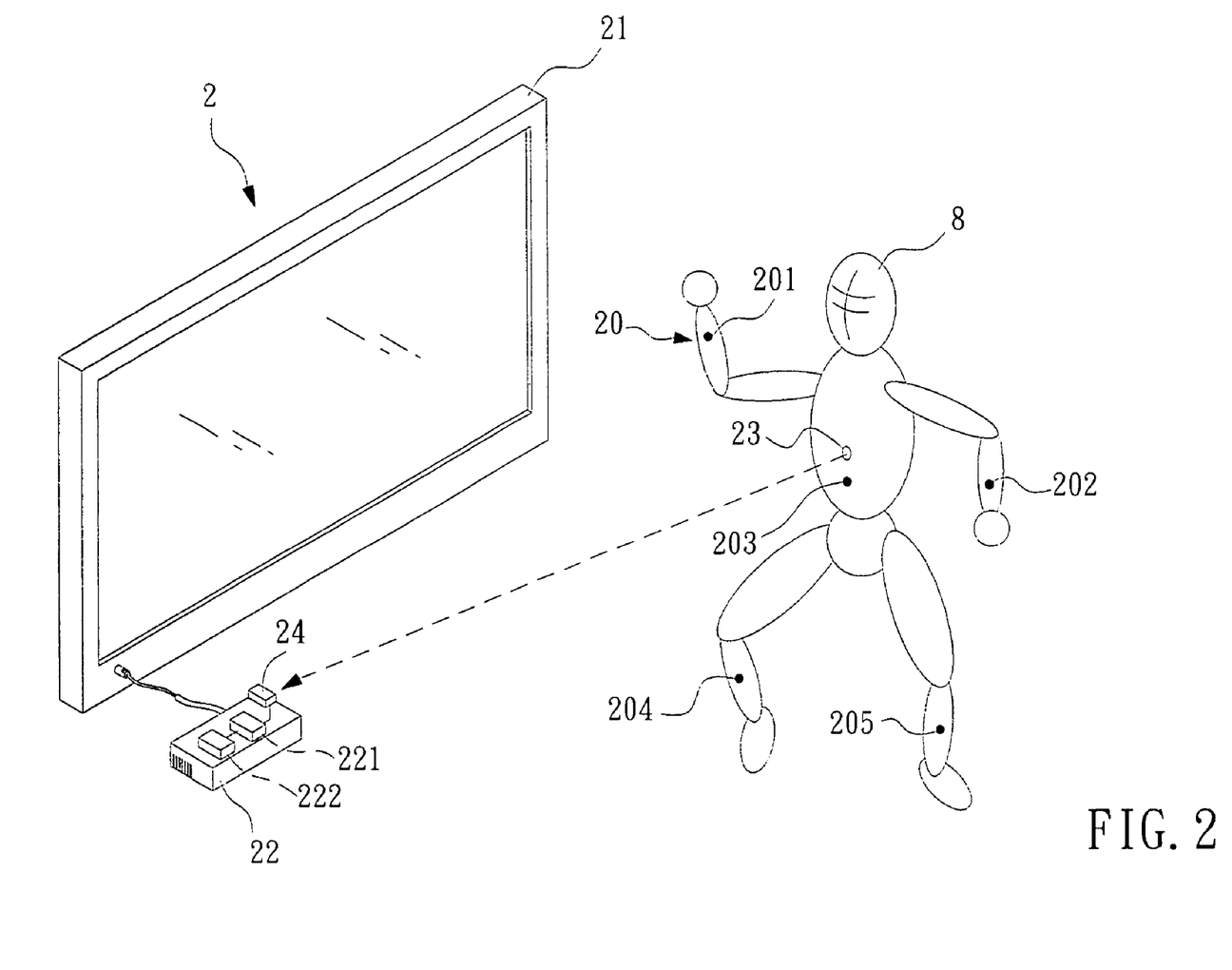
FIG. 2 is a schematic diagram depicting a motion recognition system for controlling an electronic device to interact with a user according to a preferred embodiment of the invention.

Please refer to FIG. 2, which is a schematic diagram depicting a motion recognition system for controlling an electronic device to interact with a user according to a preferred embodiment of the invention. The motion recognition system 2 of FIG. 2 includes an inertial sensing module 20 composed of at least an inertial sensor, which are respectively adapted to be arranged at different position of the user's body. In the preferred embodiment of FIG. 2, there are five inertial sensors 201~205, that are respectively being attached at the two wrists, the waist, and two knee joints of the user 8. It is noted that the inertial sensors can be positioned at any position as required, and is not limited by those shown in the foregoing embodiment.

The inertial sensing module 20 is used to detect and measure a motion of the body so as to correspondently obtain a plurality of gesture parameters, such as angular velocity and acceleration, etc., and generate gesture signals accordingly. Thereafter, the gesture signals are transmitted to an operation control module 22 by a wireless communication means 23, whereas the operation control module 22 is comprised of a radio frequency receiver 24, a storage unit 221 and a control unit 222. The storage unit 221 is used for storing at least a predefined motion information sequence, which can be a time series of acceleration, a time series of angular velocity, or a time series of acceleration and angular velocity. Taking a motion sequence for example as the motion sequence is composed of successive gestures of raising a hand, waiving the raised hand and laying down the raised hand and is being performed by the user 8, the inertial sensing module 20 is able to detect and measure gesture parameters while plotting the detected parameters as a function of time such that it is possible for the user 8 to previously define and store standard gesture parameters corresponding to such motion sequence, as well as the relating function of time, in the storage unit 221.

The control unit 222 is electrically connected to the radio frequency receiver 24 and the storage unit 221, such that the control unit is enabled to receive the gesture signals and perform a calculation upon the received gesture signal to obtain an input gesture sequence while comparing the input gesture sequence with the predefined motion information sequence stored in the storage unit 221. If the input gesture sequence matches the predefined motion information sequence, the control unit will issue a control signal for directing an electronic device 21 to operate accordingly or to interact with the user 8. It is noted that the input gesture sequence also can be a time series of acceleration, a time series of angular velocity, or a time series of acceleration and angular velocity, etc. In the preferred embodiment of the invention, the electronic device 21 can be a household appliance of remote control, such as TV, air conditioner, juicer, etc., or an interactive multimedia device, such as virtue reality platform, game platform, etc.

Figure 3:
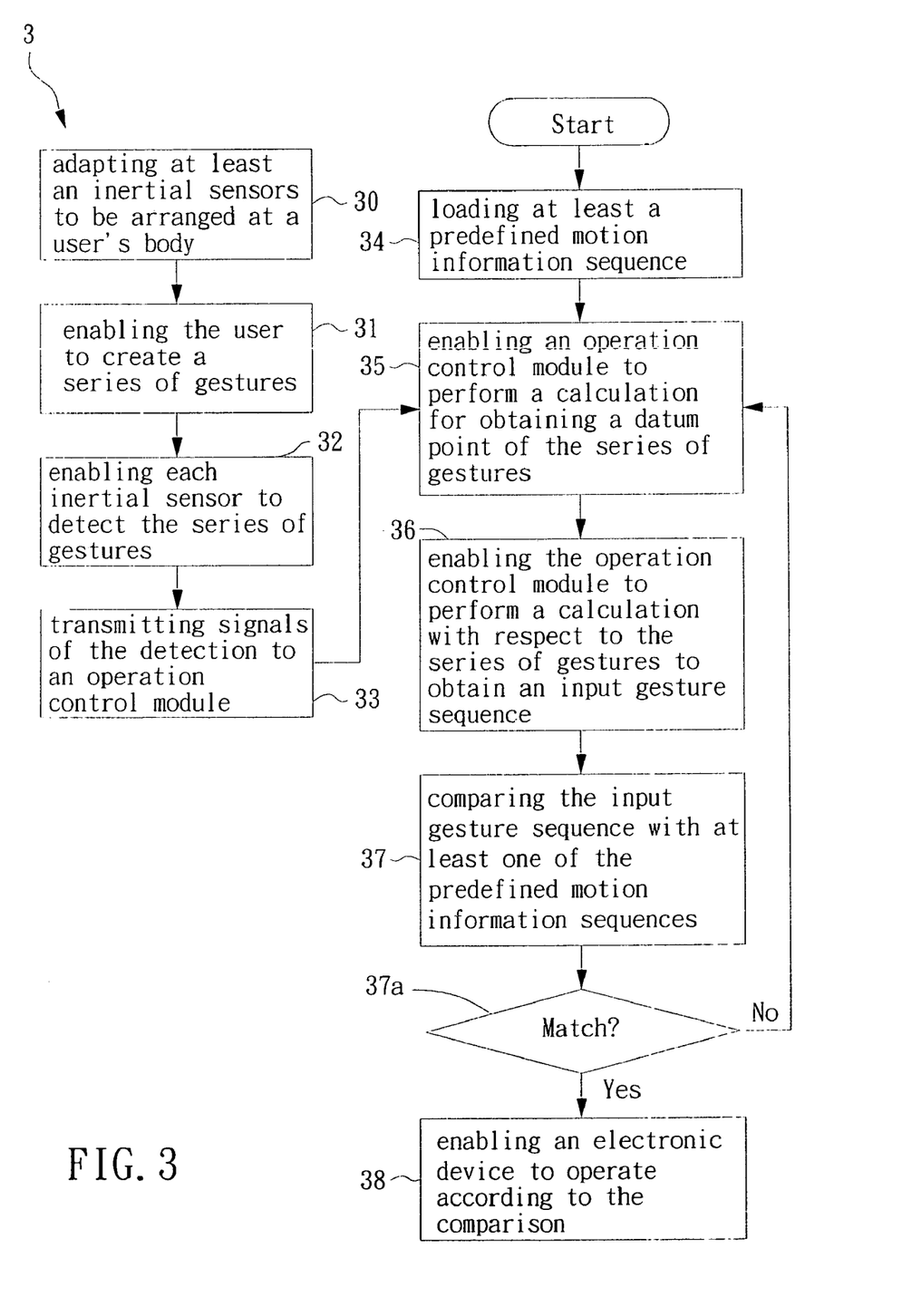
FIG. 3 is a flowchart illustrating a motion recognition method for controlling an electronic device to interact with a user according to a preferred embodiment of the present invention.

Please refer to FIG. 3, which a flowchart illustrating a motion recognition method for controlling an electronic device to interact with a user according to a preferred embodiment of the present invention. At the step 30 of the flowchart 3 of a motion recognition method of FIG. 3, an inertial sensing module is adapted to be arranged at a user's body while positioning each inertial sensor of the inertial sensing module at a location specified by the user, and then the flow proceeds to step 31. At step 31, the user is enabled to create a series of gestures, and then the flow proceeds to step 32. At step 32, the inertial sensing module is enabled to detect the series of gestures, and then the flow proceeds to step 33. In a preferred aspect of the invention, the inertial sensing module employs a signal having frequency within the range of 20 Hz~100 Hz to detect the series of gesture and thus generate detection signals corresponding to the accelerations or angular velocities of such series of gestures, but the frequency range is not limited thereby. At step 33, the detection signals are transmitted to an operation control module by a wireless communication means, and then the flow proceeds to step 35.

Before the operation control module had received the detection signals, step 34 is being performed, where as a predefined motion information sequence is loaded in a storage unit. The predefined motion information sequence can be a single motion control signal or a combination of a plurality of motion control signals. For instance, the signal motion signal can be a signal representing left-moving, right-moving, turn, hand-raising, letting-go, turning-kick, punching, hooking, or leg-raising, etc; and the combination of a plurality of motion control signals can be a combination of the aforesaid signals, such as a combined signal representing successive motions of hand-raising and letting-go, or a combined signal representing successive motions of punching, hooking and letting-go, etc. Moreover, he predefined motion information sequence can be composed of control signals capable of enabling an interactive platform to generate a series of predefined motions, such as moving-upward, moving-downward. Left-moving, right-moving, or spinning, etc.

At step 35, the detection signals of step 33 are received by the operation control module, whereas the detection signals are decoded and sent to the control unit configured in the operation control module to be analyzed for obtaining a datum point, and then the flow proceeds to step 36. At step 36, the control unit performs a calculation upon the signals received thereby to obtain an input gesture sequence, and then the flow proceeds to step 37. At step 37, a comparison is performed between the input gesture sequence and the predefined motion information sequences, and then the flow proceeds to step 37a. At step 37a, an evaluation is performed to determine whether the input gesture sequence matched the predefined motion information sequences; if so, then the flow proceeds to step 38; otherwise, the flow proceeds back to step 35. At step 38, an electronic device to is enabled to operative according to the comparison.

Figure 4A:
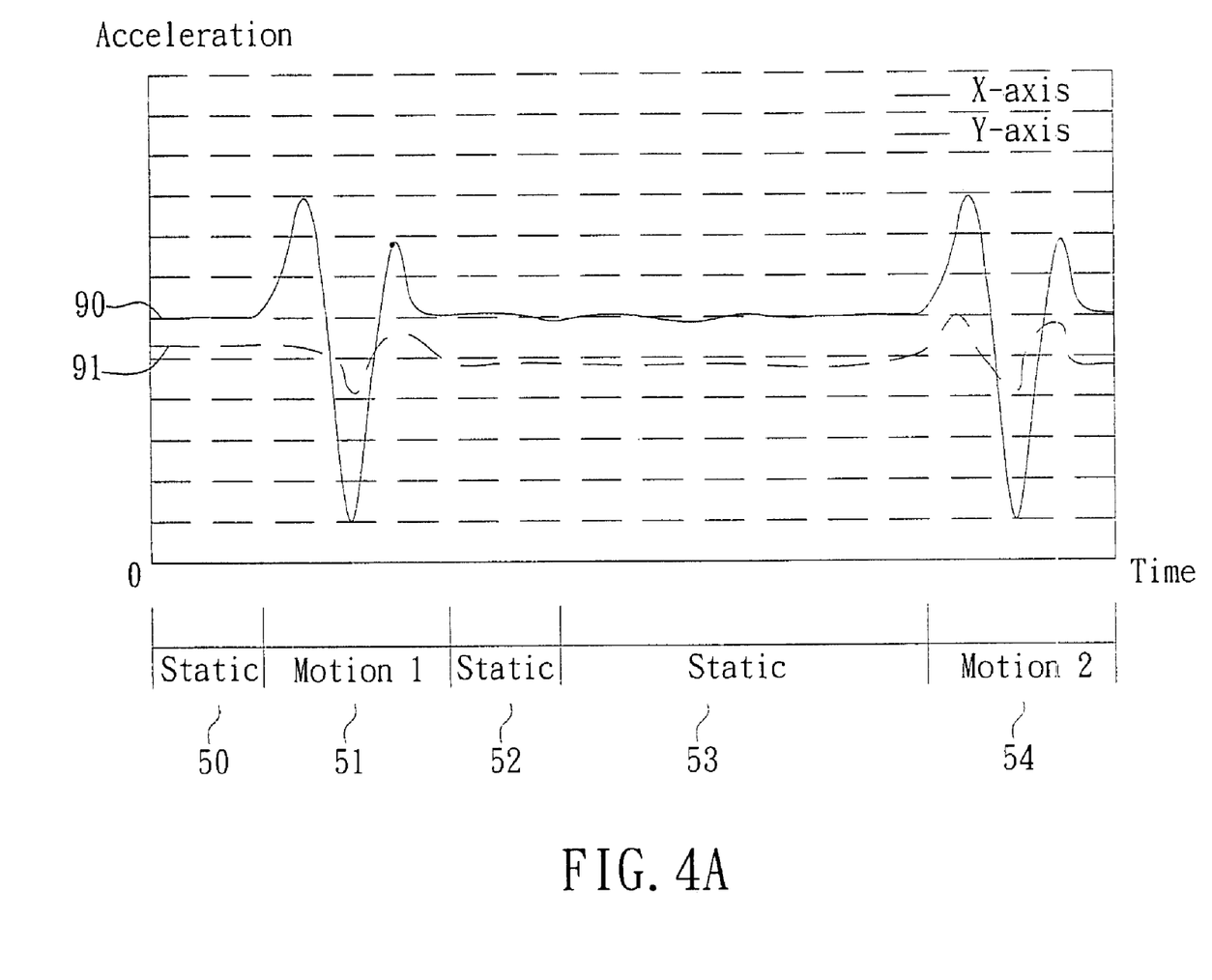
FIG. 4A shows a predefined motion information sequence according to a preferred embodiment of the present invention.

For clarity, detailed descriptions relating to the operations performed in step 36 and step 37. Please refer to FIG. 4A and FIG. 4B, which respectively shows a predefined motion information sequence and an input gesture sequence according to a preferred embodiment of the present invention. In FIG. 4A, the curve 90 represents a time series of acceleration measured along an X-axis in a predefined motion information sequence while the curve 91 represents a time series of acceleration measured along a Y-axis in the same predefined motion information sequence. Both time series of acceleration can be divided into five sessions, whereas the first session 50, the third session 52, and the fourth session 53 of the two time series shows that the user is static while the second session 51 and the five session 54 shows that the user is creating a gesture, i.e. motion 1 and motion 2 in respective, such as raising a hand, waiving or twisting waist.

Figure 4B:
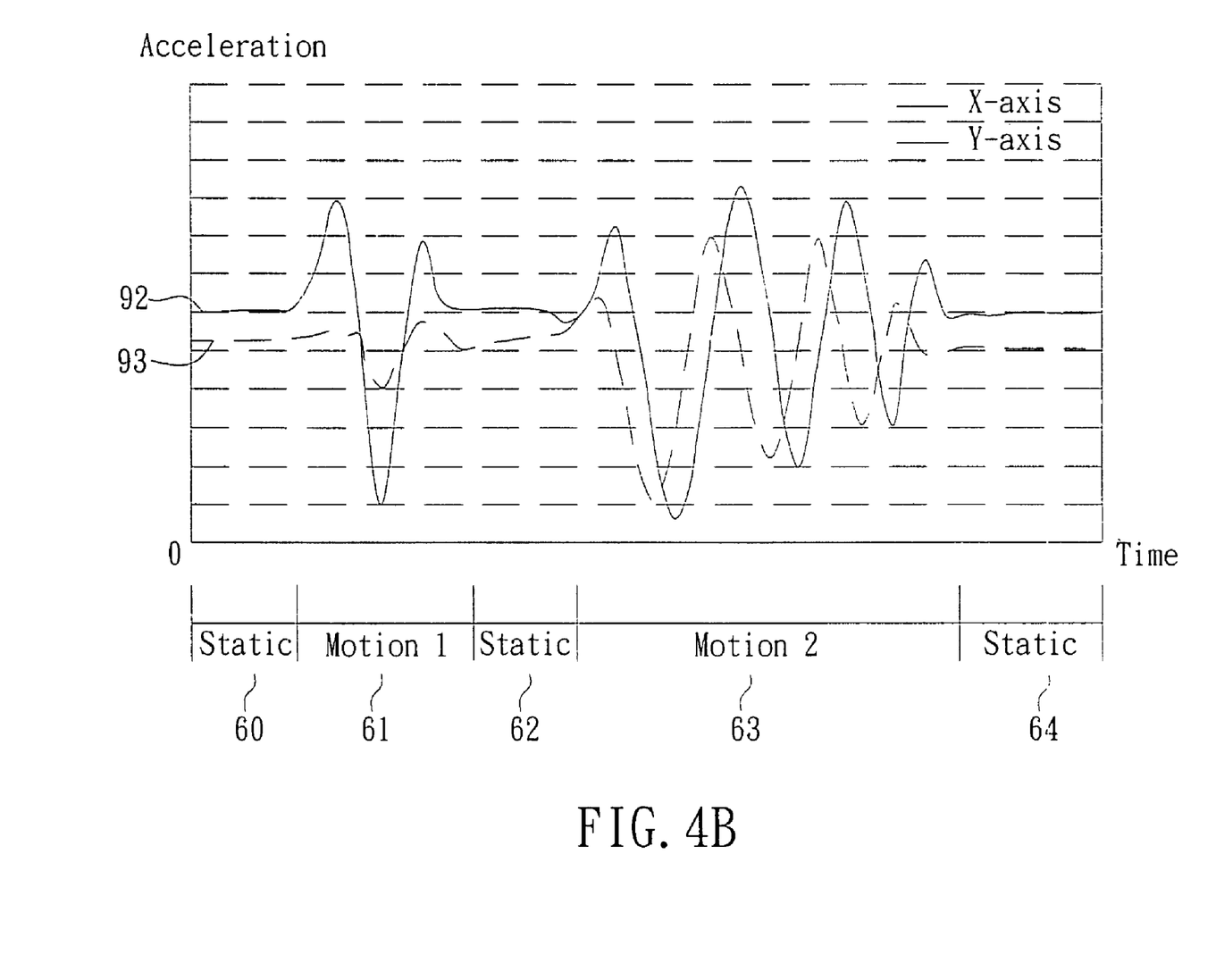
FIG. 4B shows an input gesture sequence according to a preferred embodiment of the present invention.

As the user is creating a series of gesture not necessary the same as that of the predefined motion information sequence shown in FIG. 4A, the corresponding input gesture sequence obtained from the analysis of the control unit is shown in FIG. 4B. In FIG. 4B, the curves 92, 93 represent respectively a time series of acceleration measured along an X-axis and another time series of acceleration measured along a Y-axis. Similarly, the two curves 92, 93 can be divided into five sessions the beginning. In the first session 60, the accelerations of the two curves 92, 93 remain unchanged that represent the user is motionless, i.e. static. Thereafter, in the session 31, as the two curves 92, 93 are becoming sine waves of no phase difference while the amplitude of the curve 92 is three to four times that of the curve 93, it is realized that the user is creating a gesture, i.e. motion 1. Then, in the session 62, as the two curves 92, 93 are static, it is realized that the user is motionless again. Immediately after, in the session 63, as the two curves 92, 93 are becoming sine waves of 90 degree phase difference while the amplitude of the curve 92 is about the same as that of the curve 93, it is realized that the user is creating a gesture again, i.e. motion 2. Finally, in the session 64, as the two curves 92, 93 are static, it is realized that the user is motionless again. Therefore, by just seeing the curves of FIG. 4B, it is concluded that the corresponding input gesture sequence are composed of successive gestures of static 60, motion 1 61, static 62, motion 2 63, and static 64.

Figure 4C:
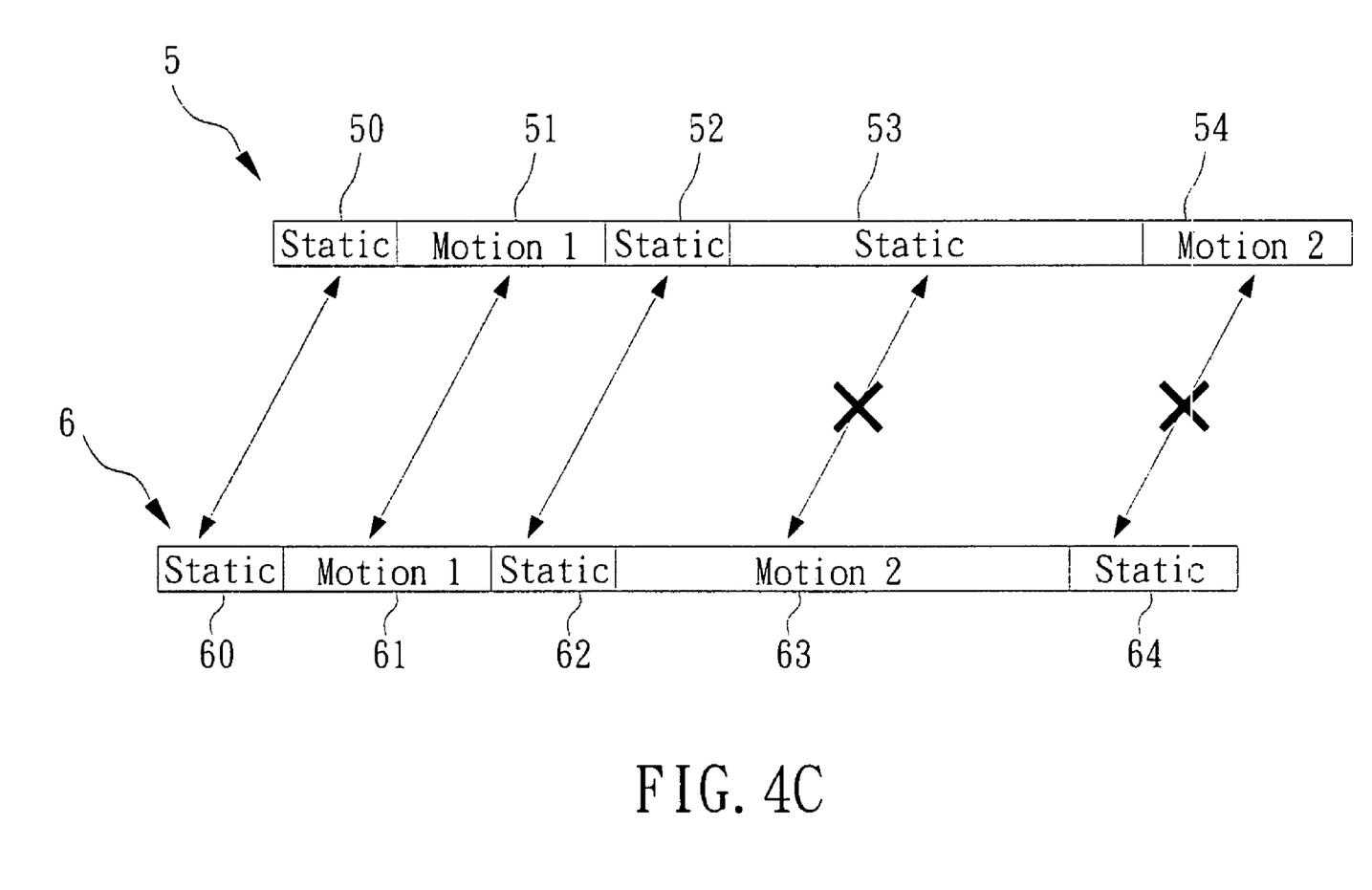
FIG. 4C is a schematic diagram depicting a comparison of a predefined motion information sequence and an input gesture sequence according to a preferred embodiment of the present invention.

For providing a detailed description relating to the operation performed in step 37, please refer to FIG. 4C, which is a schematic diagram depicting a comparison of a predefined motion information sequence and an input gesture sequence according to a preferred embodiment of the present invention. In FIG. 4C, the successive gesture series 5 is the predefined motion information sequence shown in FIG. 4A while the successive gesture series 6 is the input gesture sequence shown in FIG. 4B. As the successive gesture series 5 is composed of successive gestures of static 50, motion 1 51, static 52, static 53, and motion 2 54, which is obviously not -match with the successive gesture series 6 composed of static 60, motion 1 61, static 62, motion 2 63, and static 64. Therefore, as the result of the comparison shown in the embodiment of FIG. 4C is "not match", according to the flowchart of FIG. 3, the next proceeding is to make a system ready for receiving a new input gesture sequence. However, if the result is "match", then the next proceeding is to enable an electronic device to operate accordingly.

Figure 5A:
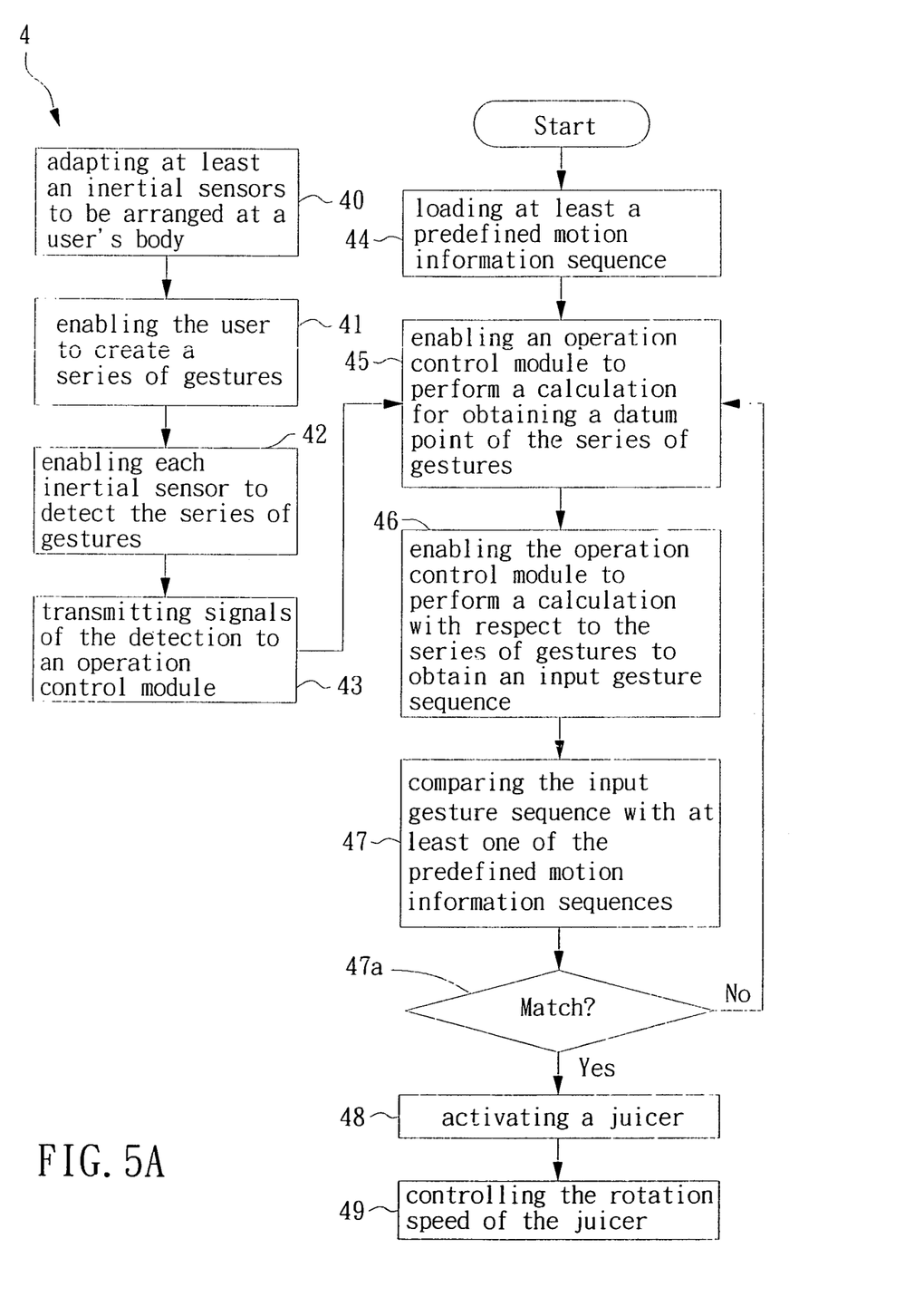
FIG. 5A and FIG. 5B are used to show a flowchart of a motion recognition method for controlling an electronic device to interact with a user according to another preferred embodiment of the present invention.

In addition to the aforesaid operations, the motion recognition system and method of the invention is capable of defining a series of gestures to be used as a code for locking/unlocking, or activate/deactivate an electronic device. For instance, when an electronic device is designated to be activated by a code while defining the code to be a predefined motion information sequence similar to that shown in FIG. 4A, a user can activate the electronic device by performing an input gesture sequence that matches the predefined motion information sequence. Moreover, the motion recognition system and method of the invention is capable of detecting motion parameters generated by a series of a user's gestures while performing a calculation upon the detected parameters for obtaining a momentum to be used for controlling an electronic device to interact with the user accordingly. It is noted that the momentum can be acceleration, velocity, displacement, frequency, time or the combination thereof, and moreover, it can be a measurement of calorie consumed per unit time obtained by performing a conversion upon those detected parameters. Please refer to FIG. 5A and FIG. 5B, which are used to show a flowchart of a motion recognition method for controlling an electronic device to interact with a user according to another preferred embodiment of the present invention. In the flowchart shown in FIG. 5A and FIG. 5B, except for the step 40, in which an inertial sensing module is arranged at a user's waist, the following steps 41~47 are the same as those steps 31~37 shown in FIG. 3, and thus are not describe further herein. If the result of the comparison performed at step 47a is "match", the flow proceeds to step 48 where a juicer is activated. As soon as the juicer is activated, in the proceeding of step 49, the rotation speed is enabled to be controlled by a motion specified by a user or others, such as a hula-hooping motion. If the juicer is specified to be controlled by a hula-hooping motion, the parameters to be detected and converted in momentum for controlling the juicer can be the rotation speed of the hula-hooping and the duration of the hula-hooping.

Figure 5B:
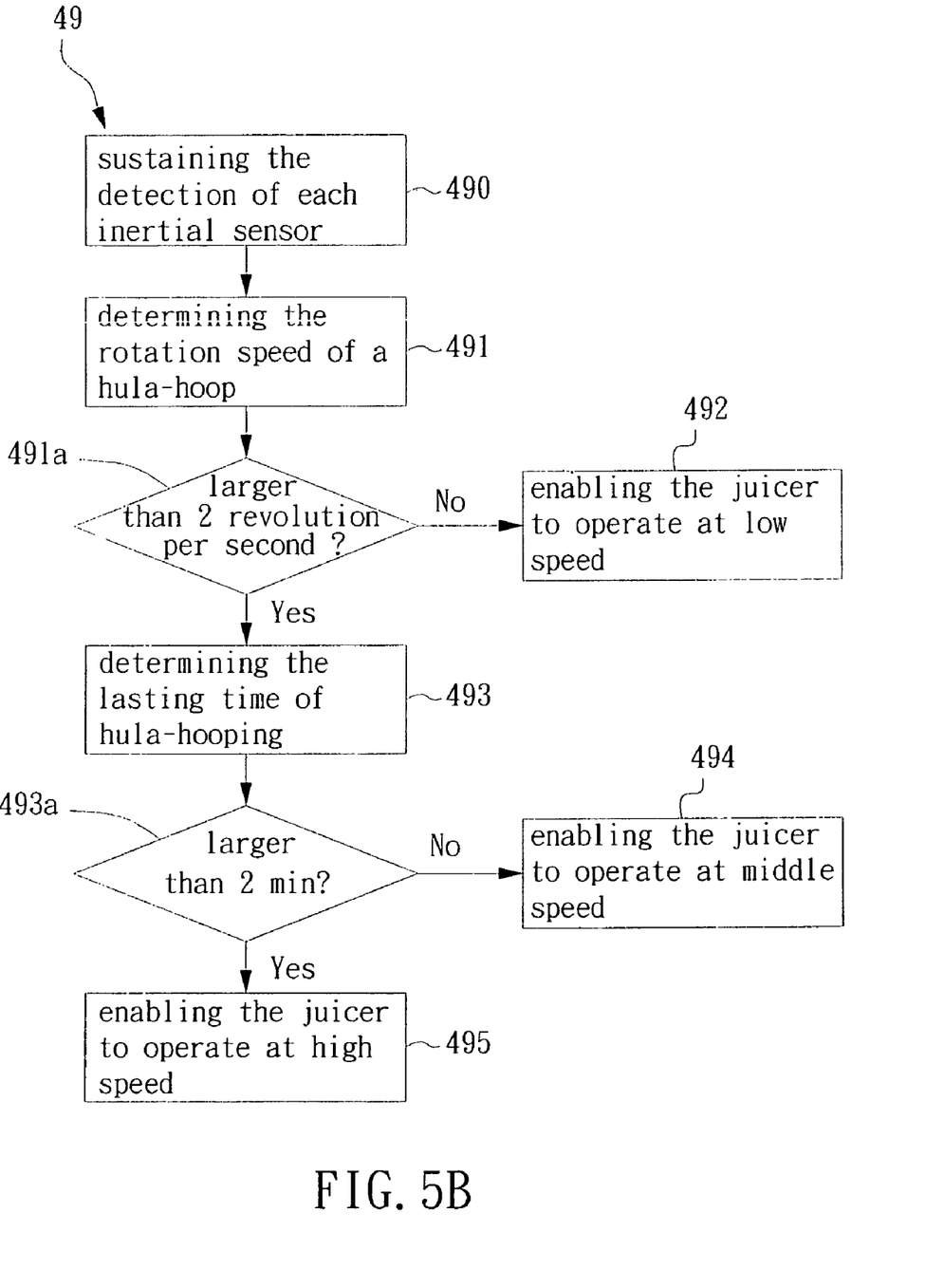

As seen in FIG. 5B, the detection of the inertial sensing module is sustained at step 490 after the juicer is activated and the rotation speed thereof is specified to be controlled by a waist motion like hula-hooping. At Step 491, an evaluation is made to verify the rotation speed of the hula-hooping, and then the flow proceeds to step 491a. At step 491a, a comparison is made to determine whether the rotation speed of the hula-hooping is larger than 2 revolutions per second; if so, the flow proceeds to step 493; otherwise, the flow proceeds to step 492. At step 492, the juicer is set to operate at low speed. At step 493, an evaluation is made to verify the duration of the hula-hooping, and then the flow proceeds to step 493a. At step 493a, a comparison is made to determine whether the duration is lasting longer than 5 min; if so, the flow proceeds to step 495; otherwise, the flow proceeds to step 494. At step 494, the juicer is set to operate at middle speed. At step 495, the juicer is set to operate at high speed. Since a juice can only be prepared by the juicer operating at high speed, a user must exercise hard enough to have a glass of juice that the interest of exercise is increased by the interaction with the juicer.

To sum up, the present invention provide a compact motion recognition system that is not only portable, but also can detect motion status performed by various part of a user's body. In addition, it is capable of defining a series of gestures to be used as a code for locking/unlocking, or activate/deactivate an electronic device.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A motion recognition method for controlling an electronic device to interact with a user, comprising steps of:
   providing a predefined motion information sequence;
   utilizing an inertial sensor to detect a series of gestures created by the user;
   processing signals detected by the an inertial sensor to form an input gesture sequence;
   comparing the input gesture sequence with the predefined motion information sequence for generating a series of motion control signals;
   processing signals detected by the inertial sensor and measured time intervals for obtaining a momentum value;
   converting the momentum value into a calorie consumption rate indicating a measurement of calorie consumed per unit time;
   generating a signal for activating and controlling the electronic device based at least in part on the calorie consumption rate; and
   utilizing the signal to control the electronic device to operate in accordance with the motion control signals and the calorie consumption rate.

2. The method of claim 1, wherein the predefined motion information sequence is a sequence selected from the group consisting of a single motion control signal and a combination of a plurality of motion control signals.

3. The method of claim 1, wherein the predefined motion information sequence is composed of control signals capable of enabling an interactive platform to generate a series of predefined motions.

4. The method of claim 1, wherein the predefined motion information sequence is substantially a time series of acceleration.

5. The method of claim 1, wherein the predefined motion information sequence is substantially a time series of angular velocity.

6. The method of claim 1, further comprising a step of:
   enabling the electronic device to operate according to the series of motion control signals while the input gesture sequence matches the predefined motion information sequence.

7. The method of claim 6, wherein the electronic device is a household appliance.

8. The method of claim 6, wherein the electronic device is an interactive multimedia device.

9. A motion recognition system for controlling an electronic device to interact with a user, comprising:
   an inertial sensor, adapted to be arranged on the user's body, for detecting a gesture parameter of the body and generating a gesture signal accordingly; and
   an operation control module, for receiving the gesture signal, further comprising:
   a storage unit, for storing at least a predefined motion information sequence; and
   a control unit, electrically connected to the storage unit, for performing a calculation upon the received gesture signal to obtain an input gesture sequence while comparing the input gesture sequence with at least one of the predefined motion information sequences stored in the storage unit wherein the control unit is capable of processing signals detected by the inertial sensor for obtaining a momentum value, converting the momentum value into a calorie consumption rate indicating a measurement of calorie consumed per unit time, generating a signal for activating and controlling the electronic device based at least in part on the calorie consumption rate, and utilizing the signal for controlling the electronic device to interact with the user in accordance with the input gesture sequence and the calorie consumption rate.

10. The system of claim 9, wherein the predefined motion information sequence is substantially a time series of acceleration.

11. The system of claim 9, wherein the predefined motion information sequence is substantially a time series of angular velocity.

12. The system of claim 9, further comprising: the electronic device, capable of receiving a control signal issued by the control unit and thus being enabled to operate accordingly.

13. The system of claim 12, wherein the electronic device is a household appliance.

14. The system of claim 12, wherein the electronic device is an interactive multimedia device.

15. The system of claim 9, wherein the gesture signal is transmitted to the operation control module by a wireless communication means.

16. The system of claim 9, wherein the gesture parameter is an angular velocity.

17. The system of claim 9, wherein the gesture parameter is an acceleration.

18. A motion recognition method for controlling an electronic device to interact with a user, comprising steps of:
   loading a predefined motion information sequence into a storage unit;
   adapting an inertial sensor to be arranged at the user's body;
   enabling the user to create a series of gestures;
   enabling each inertial sensor to detect the series of gestures;
   performing a signal processing operation upon signals detected by each inertial sensor to form an input gesture sequence;
   comparing the input gesture sequence with each predefined motion information sequence, and generating a series of motion control signals while the input gesture sequence matches at least of the predefined motion information sequence;
   enabling the electronic device to operate in response to a generated signal according to the series of motion control signals; and
   processing signals detected by the at least one inertial sensor for obtaining a momentum value and converting the momentum value into a calorie consumption rate indicating measurement of calorie consumed per unit time, and generating a signal based at least in part on the calorie consumption rate for activating and controlling the electronic device for interaction with the user accordingly.

19. The method of claim 18, wherein the predefined motion information sequence is substantially a time series of acceleration.

20. The method of claim 18, wherein the predefined motion information sequence is substantially a time series of angular velocity.

21. The method of claim 18, wherein the electronic device is a household appliance.

22. The method of claim 18, wherein he electronic device is an interactive multimedia device.

23. The method of claim 18, wherein the signal processing operation further comprises steps of:

performing a calculation to obtain a datum point of the series of gestures created by the user; and processing signals detected by the sensors to analyze the series of gestures and thus generate an input gesture sequence.

24. The method of claim 18, wherein the predefined motion information sequence is a sequence selected from the group consisting of a single motion control signal and a combination of a plurality of motion control signals.

25. The method of claim 18, wherein the predefined motion information sequence is composed of control signals capable of enabling an interactive platform to generate a series of predefined motions.

* * * * *